Nov. 27, 1951          J. DERCK          2,576,332
STRAINER
Filed April 8, 1949
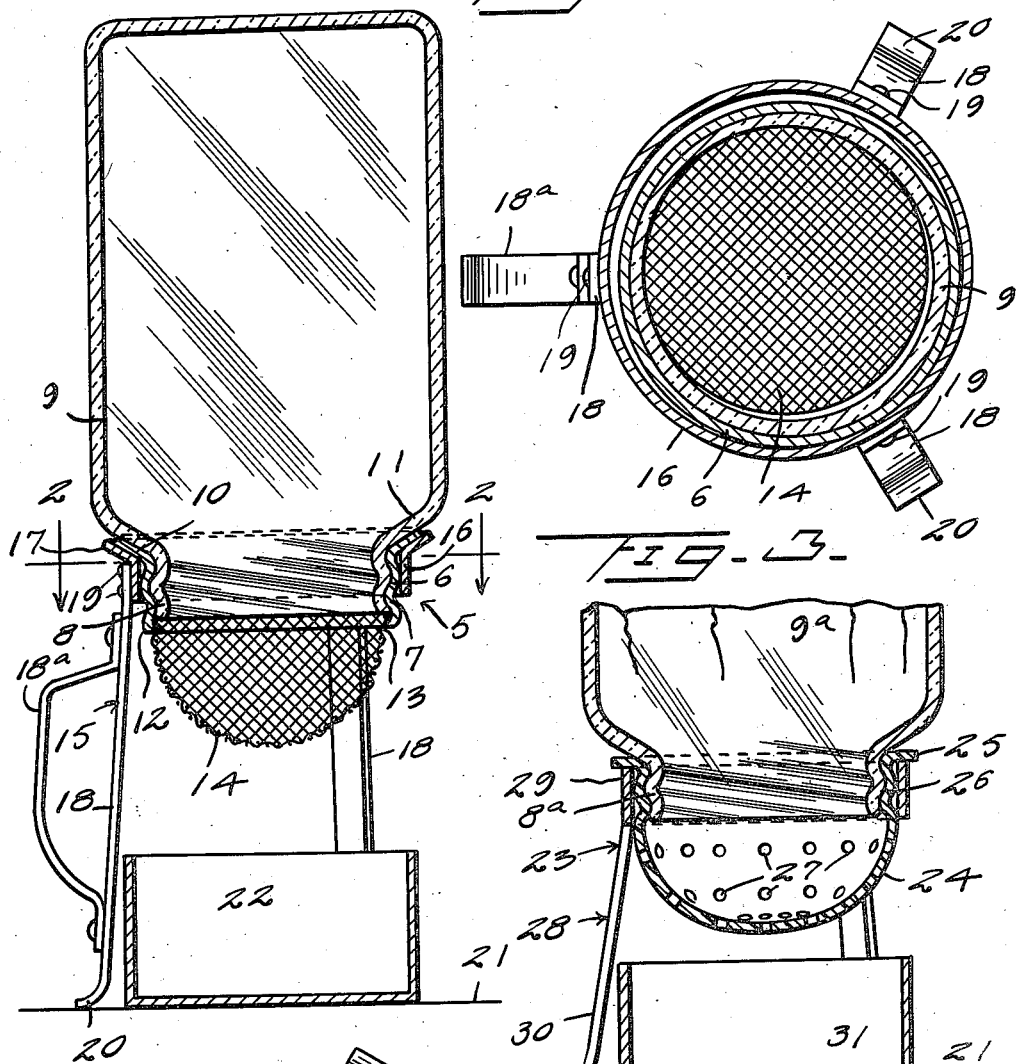
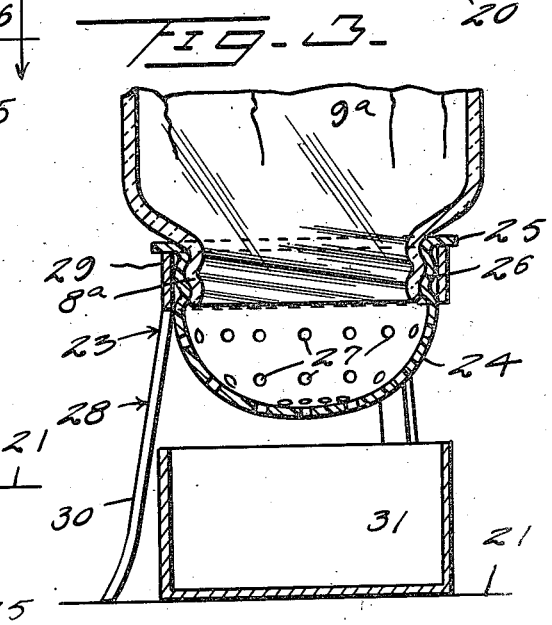
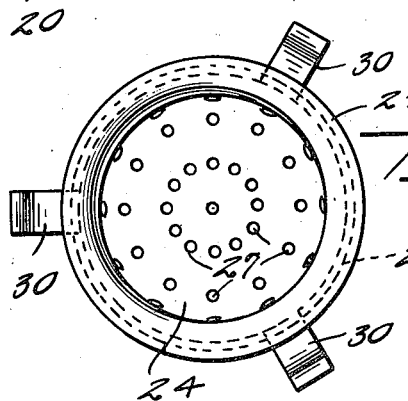
Inventor
Josephine Derck
By John N. Randolph
Attorney Patented Nov. 27, 1951

2,576,332

UNITED STATES PATENT OFFICE 2,576,332

STRAINER

Josephine Derck, Sparta, Mich.

Application April 8, 1949, Serial No. 86,319

2 Claims. (Cl. 210—163.5)

1

This invention relates to a novel construction of strainer or colander for use as a jar attachment for draining and extracting fruit and vegetable juices without requiring attention during the draining or straining operation.

More particularly, it is a primary object of the present invention to provide a strainer or colander capable of being detachably connected to the open neck of a fruit jar or the like containing a fruit or vegetable to be strained or drained and whereby the jar with the strainer or colander detachably applied thereto may be supported in an inverted position over a receptacle for straining or extracting the juice from the fruit or vegetable and which will not require attention during the straining operation.

Various other objects and advantages of the invention will hereinafter become more fully apparent from the following description of the drawing, illustrating presently preferred embodiments thereof, and wherein:

Figure 1 is a vertical sectional view, partly in side elevation illustrating one form of the invention in an applied and operative position;

Figure 2 is a cross sectional view thereof taken substantially along a plane as indicated by the line 2—2 of Figure 1;

Figure 3 is a fragmentary vertical sectional view, partly in side elevation, illustrating another embodiment of the invention, and Figure 4 is a top plan view of the structure of Figure 3, with the jar removed therefrom.

Referring more specifically to the drawing and first with reference to the form of the invention as illustrated in Figures 1 and 2, the novel strainer as disclosed therein and designated generally 5 includes a ring 6 formed of metal, plastic or other suitable material which is relatively wide and pressed to define an internal thread 7 of the proper size and pitch to detachably engage on the threaded neck 8 of a conventional fruit jar 9 and which has one side edge flared outwardly to define an annular flange 10 which is adapted to engage flush against a portion of the outer side of the annular flared shoulder 11 of the jar 9 when the ring 6 is in a fully applied position thereon, as illustrated in Figure 1.

The neck engaging ring 6 is of a length or cross sectional width so that its opposite annular edge extends beyond the rim of the jar neck 8 and said edge 12 is flared inwardly to provide a seat for the annular rim or edge 13 of a substantially hemispherical hollow strainer member 14 which is preferably formed of mesh wire fabric and the edge 13 of which is suitably secured to the ring

2 edge 12, in any desired manner and so that the strainer member 14 will project outwardly from said edge 12.

The strainer 5 also includes a support, designated generally 15 including a ring 16 which is sized to detachably receive the ring 6 therein and which is provided with a flared upper edge 17 against which the opposite side of the annular flared portion 10 engages when the strainer ring 6 and strainer element 14 are in their positions of Figure 1. The supporting ring 16 is provided with at least three supporting legs 18 the upper ends of which are secured to the lower portion of the ring 16, beneath its flared portion 17, each by two fastenings 19. The legs 18 project downwardly from the ring 16 in diverging relationship and are provided with outturned lower end portions forming foot members 20 adapted to rest on a supporting surface 21 for supporting the ring 16 in an elevated position with respect thereto and over a receptacle 22 which is positioned between the diverging lower ends of the legs 18. The support 15 may be provided with a handle 18a secured to one of the legs 18.

To utilize the strainer 5 as illustrated in Figures 1 and 2, the jar 9, disposed in a normal, upright position is filled with a fruit, vegetable or other material, not shown, from which the juice is to be strained or from which juices or liquids are to be drained and the strainer unit 6, 14 is then inverted from its position of Figure 1 and the ring 6 thereof secured detachably on the threaded neck 8, as previously described. The strainer support 15 having been positioned over the receptacle 22, as illustrated in Figure 1, the jar 9 with the strainer unit 6, 14 applied thereto is then inverted and said strainer unit applied to the supporting ring 16, as illustrated in Figure 1. The jar 9 will thus be supported by the strainer ring 16 in an inverted position on the support 15 and may be left unattended while the contents of said jar is strained through the strainer element 14 into the vessel 22 or while the liquid or juices are drained from the contents of the jar, thus providing a strainer which does not have to be manually held and which will support a container for the material to be strained or drained.

Figures 3 and 4 illustrate another embodiment of the invention constituting primarily a colander which is designated generally 23 and which includes a substantially bowl shaped member 24 which is preferably formed of a plastic and which is provided with an outwardly flared annular flange 25 defining its open upper end or rim and which is provided with an annular pressed portion therebeneath defining an internal thread 36 of the proper size and pitch to engage on the externally threaded neck 8a of a jar 9a, corresponding to the jar 9.

The member 20 is provided with a perforated portion beneath its threaded portion 26 defined by a plurality of apertures 27, formed in the sides and bottom thereof.

The colander 23 also includes a support, designated generally 28 and composed of a ring 29 which is disposed around the threaded portion 26 and secured thereto in any suitable manner as by a press fit engagement or by clamping engagement therewith. The support 28 also includes at least three supporting legs 30 which depend from the ring 29 in diverging relationship to one another and which may be formed integral therewith or suitably secured thereto. The support 28 may be formed of any suitable material, such as plastic.

The colander 23 including the body member 24 and support 28 is inverted and applied to the threaded neck 8a of the jar 9a the contents of which, not shown, is to be drained, after which the jar 9a is inverted over a receptacle 31 and with the legs 30 straddling the receptacle 31 for supporting the colander body 24 thereabove and so that the liquid or juices from the contents of the container 9 may drain off through the apertures 27 into the receptacle 31.

Various other modifications and changes are contemplated and may obviously be resorted to, without departing from the spirit or scope of the invention as hereinafter defined by the appended claims.

I claim as my invention:

1. A strainer or colander comprising a foraminous body member having an open upper end, a jar having a neck engaging in the open upper end of the foraminous body member, a support including an endless member in which said upper end of the foraminous member is mounted and by which the jar is supported in an inverted position above the foraminous body member, said support having legs secured to and depending from said endless member and adapted to rest on a supporting surface for supporting said foraminous member between the legs and in an elevated position, said foraminous member comprising a substantially hemispherical portion of mesh wire fabric and a substantially rigid ring secured to the annular edge of the mesh wire fabric and forming the jar neck engaging portion thereof.

2. A strainer or colander comprising a foraminous body member having an open upper end, a jar having a neck engaging in the open upper end of the foraminous body member, a support including an endless member in which said upper end of the foraminous member is mounted and by which the jar is supported in an inverted position above the foraminous body member, said support having legs secured to and depending from said endless member and adapted to rest on a supporting surface for supporting said foraminous member between the legs and in an elevated position, said foraminous member comprising a substantially hemispherical portion of mesh wire fabric and a substantially rigid ring secured to the annular edge of the mesh wire fabric and forming the jar neck engaging portion thereof, said jar neck being externally threaded, said ring being annular and internally threaded for threadedly engaging the external thread of the jar neck.

JOSEPHINE DERCK.

REFERENCES CITED

The following references are of record in the file of this patent:

UNITED STATES PATENTS

| Number | Name | Date |
|---|---|---|
| 530,308 | Hornberger | Dec. 4, 1894 |
| 930,938 | Clement | Aug. 10, 1909 |
| 1,336,214 | Forman | Apr. 6, 1920 |
| 1,349,798 | Yeoman | Aug. 17, 1920 |
| 2,256,717 | Kors | Sept. 23, 1941 |

FOREIGN PATENTS

| Number | Country | Date |
|---|---|---|
| 426,018 | Great Britain | Mar. 26, 1935 |